United States Patent [19]

Suchor

[11] 4,224,965
[45] Sep. 30, 1980

[54] INTERLOCKING STRIP

[75] Inventor: Ronald Suchor, McHenry, Ill.

[73] Assignee: Omni Plastic Products, Inc., Glenview, Ill.

[21] Appl. No.: 8,756

[22] Filed: Feb. 2, 1979

Related U.S. Application Data

[63] Continuation-in-part of Ser. No. 925,361, Jul. 17, 1978, abandoned, which is a continuation-in-part of Ser. No. 893,322, Apr. 3, 1978, abandoned.

[51] Int. Cl.³ .............................................. F16L 11/04
[52] U.S. Cl. .................................. 138/154; 138/122; 138/129; 138/136
[58] Field of Search ................ 138/122, 129, 134, 135, 138/136, 154, 162, 166; 174/47

[56] References Cited

U.S. PATENT DOCUMENTS

| | | | |
|---|---|---|---|
| 2,288,094 | 6/1942 | Karmazin | 138/154 X |
| 2,354,485 | 7/1944 | Slaughter | 138/129 |
| 2,516,864 | 8/1950 | Gilmore et al. | 174/47 |
| 2,695,631 | 11/1954 | Seck | 138/122 |
| 2,739,089 | 3/1956 | Hageltorn | |
| 3,199,541 | 8/1965 | Richifelli | 138/129 |
| 3,255,780 | 6/1966 | Squirrell | 138/122 |
| 3,273,600 | 9/1966 | Swan | 138/122 |
| 3,311,133 | 3/1967 | Kinander | 138/122 X |
| 3,517,702 | 6/1970 | Mueller et al. | 138/166 X |
| 3,542,078 | 11/1970 | Lykle | 138/122 |
| 3,606,670 | 9/1971 | Wienand et al. | 29/450 |
| 3,656,514 | 4/1972 | Kafka | 138/166 |
| 3,679,531 | 7/1972 | Wienand et al. | 138/154 X |
| 3,861,424 | 1/1975 | Mizutoni et al. | 138/122 X |
| 4,015,072 | 3/1977 | Gillemot | 138/166 X |
| 4,046,408 | 9/1977 | Ausnit | 285/188 |
| 4,062,380 | 12/1977 | Hofle | 138/122 |

FOREIGN PATENT DOCUMENTS

| | | | |
|---|---|---|---|
| 524909 | 5/1956 | Canada | 174/47 |
| 1149680 | 6/1963 | Fed. Rep. of Germany | 138/154 |
| 1525483 | 3/1969 | Fed. Rep. of Germany | 138/166 |
| 789521 | 1/1958 | United Kingdom | 138/129 |

*Primary Examiner*—James E. Bryant, III
*Attorney, Agent, or Firm*—Wegner, Stellman, McCord, Wood & Dalton

[57] ABSTRACT

A flexible hose of a self-supporting material formed by helical revolutions of an interlocking strip. The strip includes a tongue, a groove, and an interconnecting integral wall. The groove is formed by a receptacle having an internal cavity for receiving the tongue as the strip is helically wound upon a mandrel. The internal cavity is provided with a void for receiving an adhesive or weld. The placement of the adhesive or weld within the void determines whether the hose is more suitable for vacuum, high pressure, or maximum strength use. The configuration of the strip is such that the finished hose has a smooth, relatively uninterrupted internal surface. The cross section of the strip is substantially uniform throughout, has a groove that not only renders the assembled hose capable of taking a sharper curve without collapsing, but also can receive a ground wire for use in grounding the hose, and is easier and cheaper to extrude since it uses less material.

7 Claims, 10 Drawing Figures

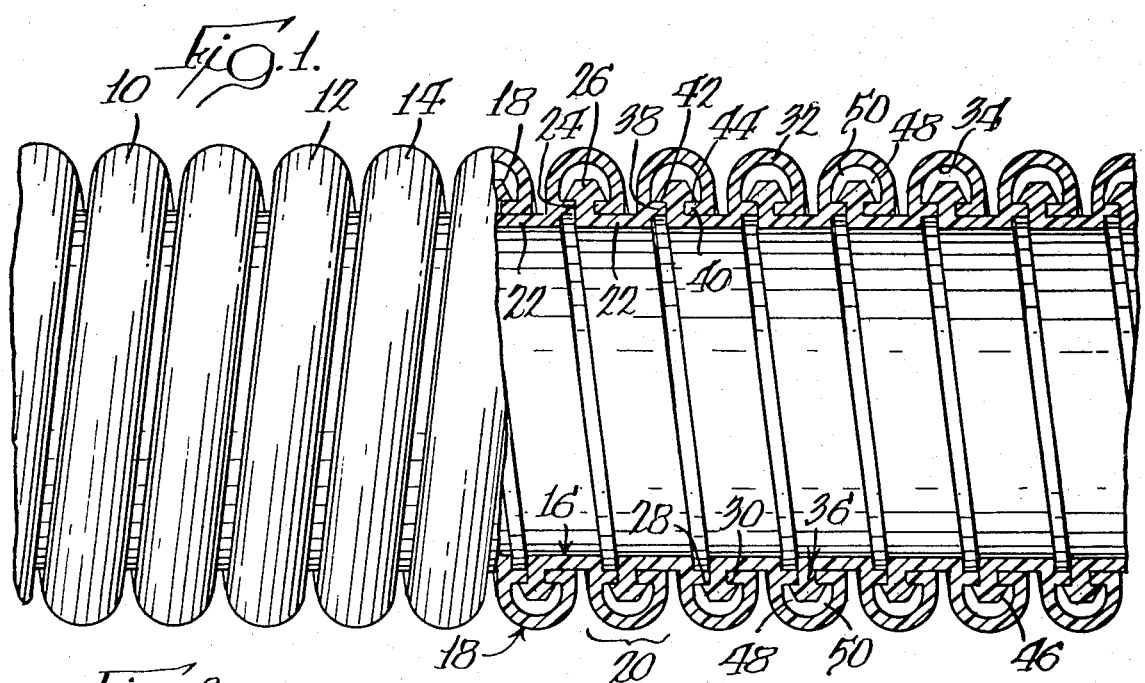
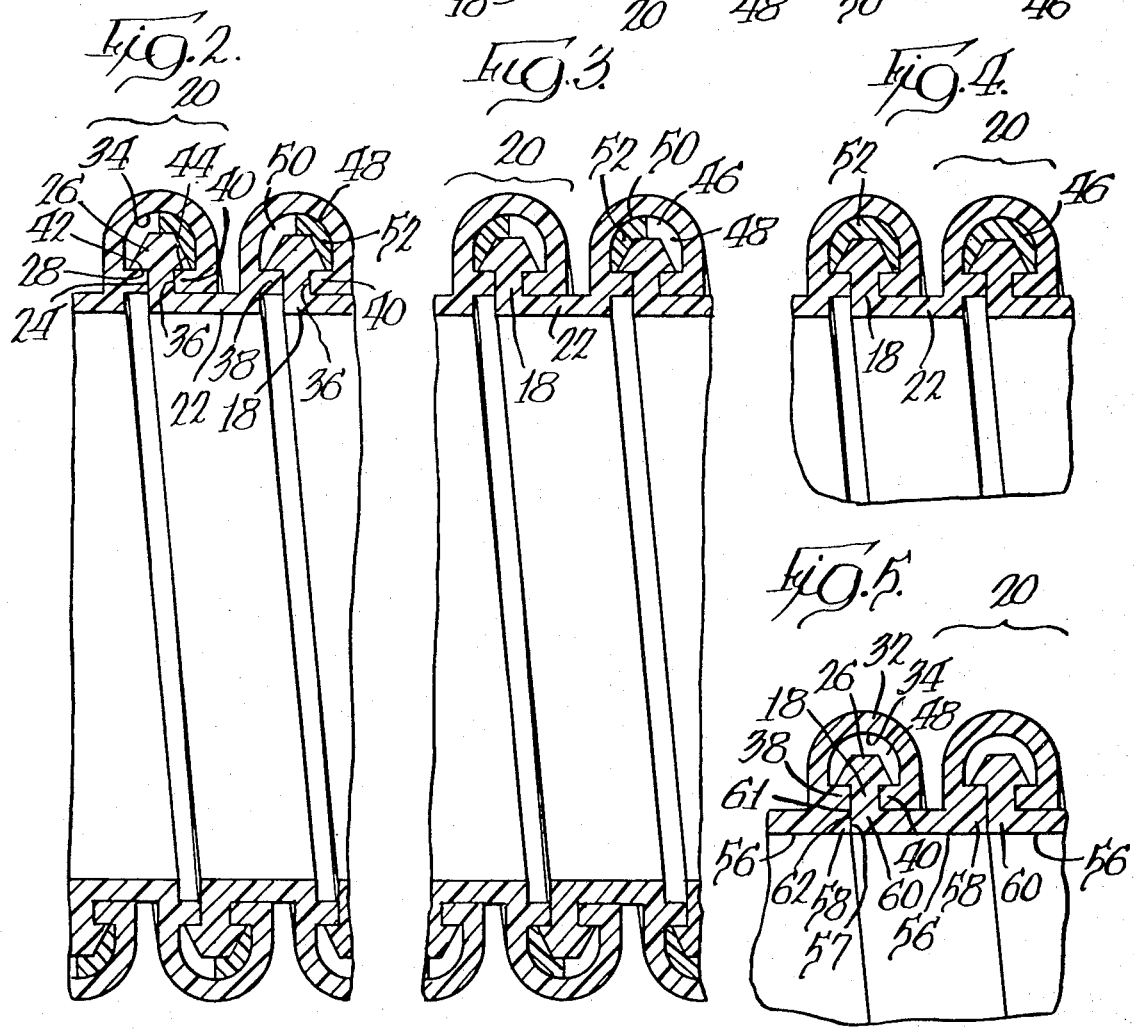

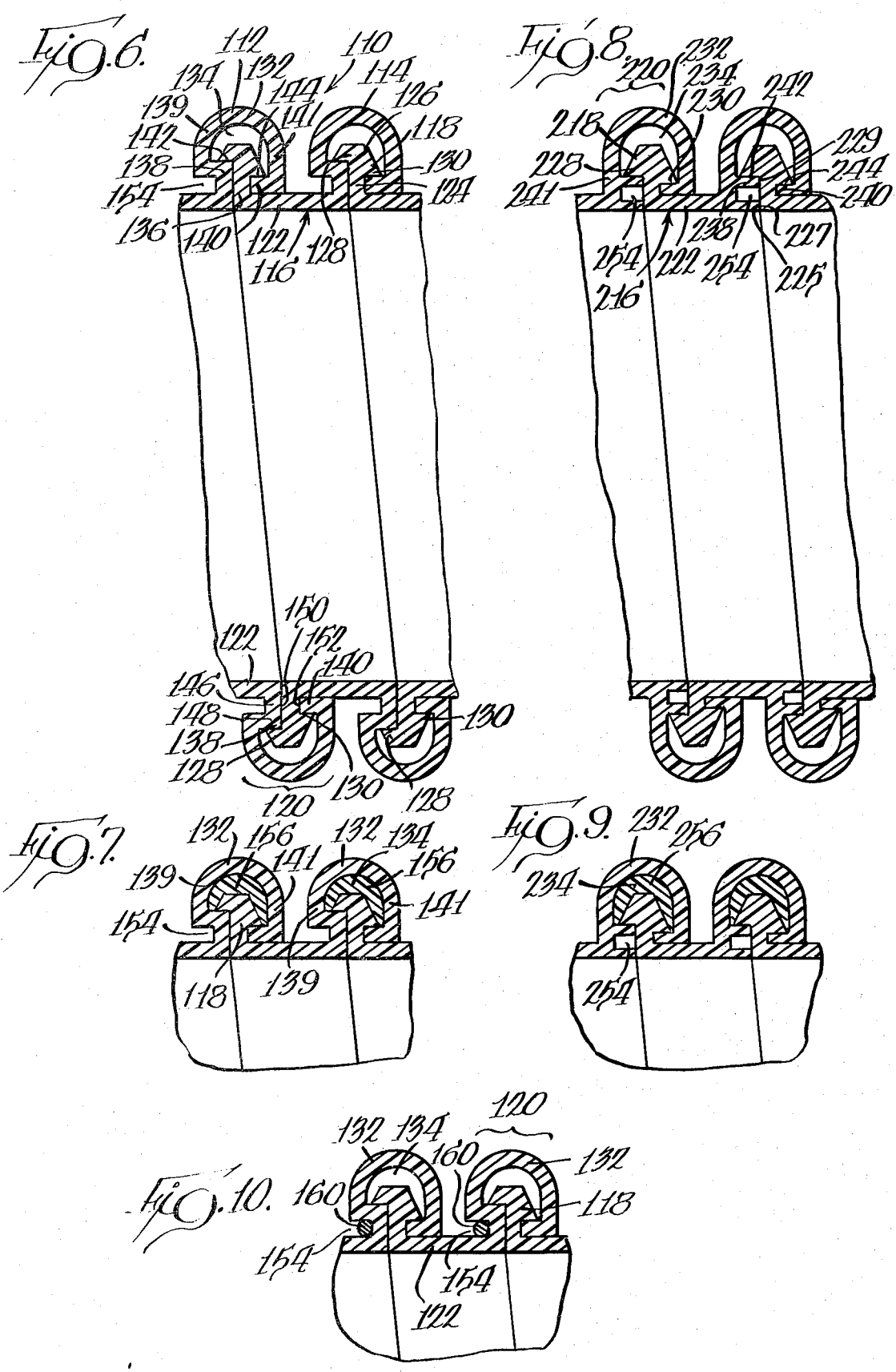

INTERLOCKING STRIP

This application is a continuation-in-part application of application Ser. No. 925,361, filed July 17, 1978, now abandoned which is a continuation-in-part Application of application Ser. No. 893,322, filed Apr. 3, 1978, now abandoned.

BACKGROUND OF THE INVENTION

This invention relates to a flexible hose and, more particularly, to a flexible hose formed by a helically wound interlocking strip.

Flexible hoses or self-supporting material have many industrial applications. Generally, the hoses are formed from endless strips helically wound upon a mandrel. Adjacent revolutions of the helix are interlocked and the cross-sectional configuration of the strip is selected in accordance with the anticipated use of the hose. For example, one cross-sectional configuration may be particularly well suited for a hose that is to contain a vacuum and another cross-sectional configuration may be well suited for a hose that is to contain high pressure. Other cross-sectional configurations may be advantageous in providing a hose of increased flexibility or strength.

The manufacture of endless strips having different configurations is expensive and there has been a need for a strip of a single cross-sectional configuration which is capable of forming hoses for various applications.

SUMMARY OF THE INVENTION

A flexible hose of a self-supporting material is formed by interlocking helical revolutions of a strip or extrusion in the form of a tongue, groove and integral wall connecting the groove with the tongue. The tongue and groove interlock in a nesting relationship as the strip is helically wound to form the flexible hose. The groove is formed by a bulbous receptacle having an internal cavity with an opening for receiving the tongue and a void for receiving an adhesive or weld therein. The placement of the adhesive or weld within the void determines whether the hose is more suitable for vacuum, high pressure or maximum strength use.

It is a feature of the present invention to provide an interlocking strip or extrusion for manufacturing a hose that is to contain a vacuum or high pressure.

Another feature of the present invention is to provide a flexible strip which, when helically wound, forms a hose of increased strength.

Another feature of the present invention is to provide an interlocking strip that has a substantially uniform cross section that is easier and cheaper to extrude.

Another feature of the present invention is to provide a hose made from winding the improved interlocking strip that is more flexible and can take a sharper curve without collapsing.

Still another feature of the present invention is to provide a hose that can be abraded on the exterior thereof to an extensive degree without opening a hole into the conduit in the hose.

Other features will be apparent when considering the specification in combination with the drawing in which:

DRAWING

FIG. 1 is an elevation view, partially in cross section, of the hose in accordance with the present invention, but without a weld or an adhesive between the interlocking strips;

FIG. 2 is an enlarged cross-sectional view of the hose of the present invention particularly well suited for containing a vacuum;

FIG. 3 is an enlarged cross-sectional view of the hose of the present invention particularly well suited for containing high pressure;

FIG. 4 is a partial, enlarged cross-sectional view of the hose of the present invention particularly well suited for increased strength;

FIG. 5 is a partial, enlarged cross-sectional view of a modified form of the hose of the present invention;

FIG. 6 is a partial, enlarged cross-sectional view of a second modified form of the hose of the present invention;

FIG. 7 is a partial, enlarged cross-sectional view of the hose of FIG. 6 only with adhesive between the tongue and groove thereof;

FIG. 8 is a partial, enlarged cross-sectional view of a third modified form of the hose of the present invention;

FIG. 9 is a partial, enlarged cross-sectional view of the hose of FIG. 8 only with adhesive between the tongue and groove thereof; and FIG. 10 is a partial, enlarged cross-sectional view of the hose of FIG. 6 only with a grounding wire seated therein.

DESCRIPTION OF PREFERRED EMBODIMENTS

Referring to FIG. 1, a flexible hose 10 is formed by a plurality of interconnecting helical revolutions, as revolutions 12 and 14, of interlocking strip 16. The interlocking strip 16 may be of any self-supporting material, as plastic, elastomeric material, or other suitable resilient product. During manufacture of hose 10, the interlocking strip 16 is wound (from left to right as shown in the drawing) about a mandrel (not shown) to provide for the interlocking or nesting relationship between the adjacent revolutions and, depending upon the intended use of the hose, a plastic weld or adhesive is selectively applied during interfitting, as will be explained in detail below.

The interlocking strip 16 includes a tongue 18, a groove 20 and an integral wall 22 connecting tongue 18 with groove 20.

Tongue 18 is formed by a shank 24 and a head 26 secured to the shank 24 at its end. The head 26 has a triangular cross-sectional configuration and the upper portion of the head 26 may be truncated. The width of the head 26 at the shank 24 is wider than the shank 24 to define opposing overhangs 28 and 30 on the underside of head 26. The length of shank 24 is selected to be approximately equal to the width of the interlocking strip 16 for reasons that will become apparent below.

The groove 20 is formed by a bulbous receptacle 32 having an internal cavity 34 with an opening 36 for receiving tongue 18 during manufacture of hose 10. Shoulders 38 and 40 span the opening 36 of cavity 34 and provide inner surfaces 42 and 44 for engaging opposing overhangs 28 and 30, respectively, on tongue 18. The shoulders 38 and 40 also aid in reducing contaminants from traversing adjacent revolutions of the interlocking strip 16. The triangular cross section of head 26 is particularly well suited for inserting tongue 18 into cavity 34 during manufacture.

A void 46 is formed within cavity 34 since the volume of the head 26 is smaller than the volume of the cavity 34. The void 46 includes a front section 48 and a rear section 50 wherein the rear section 50 is closer than the front section 48 to tongue 18. An adhesive may be provided within the void 46 partially or completely filling the void depending upon the purpose of the hose 10.

Referring to FIG. 2, the adhesive is provided to the front section 48 of void 46, rendering the hose 10 particularly useful for containing a vacuum.

Referring to FIG. 3, the adhesive is provided to the rear section 50 of void 46, rendering the hose 10 particularly useful for containing high pressure.

Referring to FIG. 4, the adhesive is provided to fill void 46 for providing a hose of increased strength when compared to that shown in FIGS. 2 and 3.

It is apparent that by selectively locating the seal within cavity 34, the interlocking strip 16 may be used to manufacture hoses for a variety of industrial applications.

Referring to FIG. 5, the integral wall 22 is extended in the area of the shoulder 38 to provide an internal surface 56. The surface 56 is joined with one wall 57 of the opening 36 to form a forwardly facing corner 58 which will abut rearwardly facing corner 60 formed by the surface 56 joining one wall 61 of the tongue 18. The wall 57 abuts wall 61 when the strip is assembled as a hose so that the corners 58 and 60 align with each other to form a relatively uninterrupted inner surface 56 for the hose. The form of invention shown in FIG. 5 is capable of having the sealing material 52 in the front section 48 of the void 46 as in FIG. 2, the rear section 50 of the void 46 as in FIG. 3 or in the whole void 46 as in FIG. 4. In addition, a seal 62 may be effected by joining wall 57 to wall 61 from the corners 58,60 to the inner surface 42 where it abuts head 26. The seal 62 reduces or eliminates openings in the surface 56 in the hose during flexing so that materials will not catch and/or accumulate in the opening between adjacent stretches of the strip when formed into the hose. The hose can flex freely but no opening will occur in the continuous surface 56 in the hose.

In the modified form of invention shown in FIGS. 6 and 7, a flexible hose 110 is formed by a plurality of interconnecting helical revolutions, as revolutions 112 and 114, of interlocking strip 116. The strip 116 includes a tongue 118, a groove 120 and an integral wall 122 connecting tongue 118 to groove 120. The tongue 118 has as shank 124 and a head 126 with the head 126 having two overhangs 128 and 130 on the underside thereof. The overhang 128 is axially displaced relative to the overhang 130 along the axis of the shank 124.

The groove or socket 120 is comprised of a bulbous receptacle 132 having an internal cavity 134 with an opening 136 for receiving the tongue 118. Shoulders 138 and 140 extend inward toward each other from the walls 139 and 141 of the receptacle 132 and provide inner surfaces 142,144 which are offset relative to each other and which engage the offset opposing overhangs 128,130. The shoulder 138 is formed by a wall 146 of a thickness somewhat equal to the thickness of wall 122 and extending at right angles thereto with the inner surface 142 being formed on a wall 148 extending transverse to the wall 146 and spaced from the wall 122. The shoulder 140 has a thickness equal to the thickness of wall 141 and extends at right angles thereto. The facing edges 150,152 of the respective shoulders 138,140 define the opening 136 with the plane of the surface 142 displaced axially along the opening 136 from the plane of the surface 144. The walls 122,146 and 148 define a slot or groove 154 exterior of the receptacle 132 and, since the thickness of said walls 122,146,148 are substantially uniform, they can be easily extruded along with the rest of the strip 116 without distortion. It has been found that the strip 116 will distort in extruding if the various portions of the cross sections of the strip 116 are not reasonably uniform. By designing the walls 122,146,148 with a uniform thickness, material is saved, the strip is easier and cheaper to extrude and the hose wound from the strip 116 is capable of taking sharper bends without collapsing.

In order to accommodate for the uniform walls 146,148 of the shoulder 138, the plane of the overhang 128 on tongue 118 is offset from the plane of the overhang 130, it being desirable to keep the thickness of the shoulder 140 substantially equal to the thickness of walls 146,148 and to position the shoulder 140 against the outer surface of the wall 122 when the strip 116 is wound into a hose or tube 110. The wall 122 of one convolution and the junction of the wall 122 and transverse wall 146 of the adjacent convolution abut each other to provide a uniform internal surface thereby reducing the possibility of catching contaminants and the like in the gaps caused by a discontinuous surface on the inside of the hose.

In FIG. 7, adhesive 156 fills the cavity 134 in the receptacle 132. It is to be understood that adhesive could be used just between the tongue 118 and the wall 139 side of the cavity 134, or the adhesive could be used just between the tongue 118 and the wall 141 side of the cavity 134. As was described, heretofore, the adhesive could be placed between the walls of the opening 136 and the tongue 118, all without departing from the spirit of the invention.

FIGS. 8 and 9 show a further modification wherein the cross section of parts of the extrusion are kept substantially uniform as in FIGS. 6 and 7. A groove 220 has a receptacle 232 with an internal cavity 234. A tongue 218 is connected to an integral wall 222 which has an axially extending sleeve 225, the axial end wall 227 of which is in radial alignment with an end wall 229 on the radially spaced shoulder 238 having an inner surface 242 facing into said cavity 234. A second shoulder 240 projects from the receptacle 232 and has an inner surface 244 facing into the cavity 234 with the plane of said surface 244 being spaced radially from the plane of said surface 242. A slot or groove 254 is formed between sleeve 225 and shoulder 238. The tongue 218 has the offset overhangs 228,230 which engage with the offset surfaces 242,244 when said tongue 218 is seated in the cavity 234. The cross sections of the parts of strip 216 are substantially uniform so as to provide the FIGS. 8 and 9 modification with all of the same advantages as the modification of FIGS. 6 and 7. In particular, sleeve 225, shoulder 238 and the lower end of wall 241 of receptacle 232 are of uniform cross section around the groove 254. The use of adhesives 256 in the cavity 234 and between the overhangs 228,230 of the tongue 218 and the shoulders 238,240 follows the same pattern described hereinabove.

FIG. 10 shows the modification of FIGS. 6 and 7 only using a grounding wire 160 seated or embedded in the groove or slot 154. A ground wire could also be seated in a slot 254 of FIGS. 8 and 9. The grounding wire 160 is continuous and can be attached to a ground on the one end and a potential source of electrical charge on the other end so as to ground the hose. A particular application of the hose would be for dispensing volatile materials wherein a ground is necessary to prevent an electrical discharge that may set off the volatile material.

The modifications of FIGS. 6-9 provide a strip having substantially a uniform cross section for the strip so as to make the strip easier and cheaper. The uniform cross section will prevent distorting the strip during extruding whereby assembly and use of the product is enhanced. The assembled hose, due to the manner of adhering the interwoven strip together, can take considerable abrasion on the dome of the receptacle 32,132, 232 without creating a leak in the hose. In fact, it has been found that the abrasion can go all the way through the material of the receptacle 132 and even then the hose will not leak especially if the adhesive has been applied to the whole inside of the cavity 134 or between the tongue 118 and the walls of the opening 136 into the cavity 134. The offset of the shoulers 138,140 and overhangs 128,130 accommodates for the uniform cross section of the walls of the receptacle and lends some added flexibility to the hose.

What is claimed is:

1. A flexible hose of a self-supporting material formed by helical revolutions of an interlocking strip comprising:

a strip of self-supporting material having:

a wall lying in a plane parallel to the axis of the hose and having side edges thereon, tongue means integrally formed on one side edge of said wall and extending outwardly substantially perpendicular to said wall, said tongue means including a shank portion secured to said wall and extending perpendicular thereto, a head portion secured to said shank portion and extending perpendicular to said wall, said head portion defining a pair of offset overhangs extending from opposite sides of said shank, each of said overhangs lying in a separate plane substantially parallel to said plane of said wall, the plane of one of said overhangs being spaced farther from said wall than the plane of the other of said overhangs;

a bulbous receptacle integrally formed on the other side edge of said wall and defining an internal cavity having an inner surface with an opening in the receptacle directed toward the plane of said side wall for receiving the shank portion of said tongue means, a pair of offset shoulders in said bulbous receptacle spanning said opening from opposite sides thereof, each of said shoulders lying in a separate plane substantially parallel to said plane of said wall, the plane of one of said shoulders being spaced farther from said wall than the plane of the other of said shoulders and providing offset spaced shoulders for engaging said offset spaced overhangs on said head portion of the tongue means when said tongue means is in said cavity; and adhesive means in said bulbous receptacle securing said head portion and overhangs of said tongue means to the inner surface of said bulbous receptacle and to said shoulders of said receptacle.

2. The flexible hose of claim 1 wherein said head is of a triangular cross section with a truncated upper portion and a stepped base portion.

3. The flexible hose of claim 1 wherein said opening into said bulbous receptacle is defined by walls of uniform thickness with one wall on one side of the opening forming one of said shoulders and the only wall of the other side of said opening defining said other shoulder, said other shoulder lying in said plane that is closer to said wall lying parallel to the axis of the hose.

4. The flexible hose of claim 3 wherein said wall on said one side of the opening that forms said one of said shoulders defines a slot with the wall lying parallel to said axis of the hose.

5. The flexible hose of claim 4 wherein a grounding wire is seated in said slot.

6. The flexible hose of claim 1 wherein said opening into the receptacle is defined on one side by a single wall extending inward from one wall of said receptacle lying parallel to the axis of the hose and on the other side by a pair of spaced apart walls lying parallel to each other and parallel to the axis of the hose and being joined by a wall lying transverse thereto with a slot formed between said last-named spaced apart walls.

7. The flexible hose of claim 6 wherein a grounding wire is seated in said slot.

* * * * *